US012785119B2

(12) United States Patent
Kwon

(10) Patent No.: US 12,785,119 B2
(45) Date of Patent: Nov. 3, 2026

(54) FUEL CELL THERMAL MANAGEMENT SYSTEM AND METHOD OF CONTROLLING THE SAME

(71) Applicants: Hyundai Motor Company, Seoul (KR); Kia Corporation, Seoul (KR)

(72) Inventor: Oh Tak Kwon, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 673 days.

(21) Appl. No.: 18/354,069

(22) Filed: Jul. 18, 2023

(65) Prior Publication Data

US 2024/0347743 A1 Oct. 17, 2024

(30) Foreign Application Priority Data

Apr. 13, 2023 (KR) ........................ 10-2023-0048602

(51) Int. Cl.

*H01M 8/04029* (2016.01)
*H01M 8/04007* (2016.01)
*H01M 8/0432* (2016.01)
*H01M 8/04701* (2016.01)

(52) U.S. Cl.

CPC ... *H01M 8/04029* (2013.01); *H01M 8/04067* (2013.01); *H01M 8/04365* (2013.01); *H01M 8/04723* (2013.01); *H01M 8/04731* (2013.01)

(58) Field of Classification Search

CPC ......... H01M 8/04029; H01M 8/04067; H01M 8/04365; H01M 8/04723; H01M 8/04731; H01M 2250/20; H01M 8/04953; H01M 8/04037; H01M 8/04358; H01M 2220/20; Y02E 60/50

See application file for complete search history.

(56) References Cited

U.S. PATENT DOCUMENTS

| | | | | |
|---|---|---|---|---|
| 11,440,437 | B2 | 9/2022 | Jung et al. | |
| 2006/0019136 | A1* | 1/2006 | Alp | H01M 8/04417 429/442 |
| 2020/0180402 | A1 | 6/2020 | Oshima | |

FOREIGN PATENT DOCUMENTS

| | | | | |
|---|---|---|---|---|
| CN | 209096524 U | * 7/2019 | | Y02E 60/50 |
| CN | 213692129 U | * 7/2021 | | Y02E 60/50 |
| CN | 115566230 A | * 1/2023 | | H01M 8/04358 |
| CN | 116435557 A | * 7/2023 | | H01M 8/04992 |
| DE | 102020205711 A1 | * 5/2021 | | H01M 10/0562 |
| JP | 2005285502 A | 10/2005 | | |

(Continued)

*Primary Examiner* — Kaity V Chandler

(74) *Attorney, Agent, or Firm* — Slater Matsil, LLP

(57) ABSTRACT

An embodiment fuel cell thermal management system may include a radiator for performing heat exchange of a coolant discharged from a fuel cell stack, a coolant supply pump for supplying the coolant to the fuel cell stack, a cathode oxygen depletion (COD) heater for increasing a temperature of the coolant supplied from the coolant supply pump, a heater core disposed downstream of the COD heater for performing heat exchange between the coolant heated by the COD heater and air for air conditioning in a vehicle interior, an air heater for heating the air passing through the heater core and for supplying the heated air to the vehicle interior, and a controller for predicting an inlet temperature of the fuel cell stack and for controlling a target temperature range of an inlet of the fuel cell stack based on the predicted inlet temperature of the fuel cell stack.

16 Claims, 4 Drawing Sheets

(56) References Cited

FOREIGN PATENT DOCUMENTS

| | | | | | |
|---|---|---|---|---|---|
| JP | 2006012563 | A | * | 1/2006 | ............. Y02E 60/50 |
| JP | 2006012564 | A | * | 1/2006 | ............. Y02E 60/50 |
| JP | 2009158341 | A | * | 7/2009 | ............. Y02E 60/50 |
| JP | 2010282808 | A | * | 12/2010 | ............. Y02E 60/50 |
| JP | 2020093592 | A | | 6/2020 | |
| KR | 20100046730 | A | | 5/2010 | |
| KR | 20110138443 | A | * | 12/2011 | ........ H01M 8/04992 |
| KR | 101610082 | B1 | | 4/2016 | |
| KR | 101619874 | B1 | | 5/2016 | |
| KR | 20210060684 | A | | 5/2021 | |
| WO | WO-2016142029 | A1 | * | 9/2016 | ........ H01M 8/04111 |

* cited by examiner

FUEL CELL THERMAL MANAGEMENT SYSTEM AND METHOD OF CONTROLLING THE SAME

CROSS-REFERENCE TO RELATED APPLICATIONS

This application claims the benefit of Korean Patent Application No. 10-2023-0048602, filed on Apr. 13, 2023, which application is hereby incorporated herein by reference.

TECHNICAL FIELD

The present disclosure relates to a fuel cell thermal management system and a method of controlling the same.

BACKGROUND

In fuel cell vehicles equipped with a fuel cell system, hydrogen used as a fuel is supplied to a fuel cell stack to generate electricity, and an electric motor is operated by the electricity generated by the fuel cell stack to drive the vehicles. The fuel cell system is a kind of power generation system for directly converting chemical energy of a fuel into electrical energy electrochemically within the fuel cell stack without converting the chemical energy into heat by combustion.

Since these fuel cell vehicles may not use conventional heating methods using waste heat of an engine, research is being actively conducted to apply a heating device of a new concept. Specifically, research is being conducted to apply coolant of which the temperature has increased due to the heat generated in the fuel cell stack to an air conditioner of the vehicles.

However, when the coolant used in the fuel cell system is used for heating assistance, the heat of the coolant is taken away by heating, resulting in a problem that a temperature of the coolant is overcooled below an appropriate temperature required by the fuel cell stack. Conversely, when the temperature of the coolant increases for heating, a situation in which the coolant flows to a radiator to prevent overheated coolant from being introduced into the fuel cell stack occurs, and in such a situation, a valve for controlling a flow rate and a path of the coolant is frequently opened or closed, resulting in a problem that the durability of the valve is degraded.

In addition, in order to meet a set temperature required by a user, a power of an air heater (positive temperature coefficient (PTC) heater) for introducing air into a vehicle interior is increased, and there exists a problem that a lot of time is required or a capacity of the air heater needs to be increased in order to meet the set temperature in a situation in which the temperature of the coolant is excessively low.

SUMMARY

The present disclosure relates to a fuel cell thermal management system and a method of controlling the same. Particular embodiments relate to a fuel cell thermal management system capable of preventing frequent opening or closing of a valve for controlling a flow rate and a path of coolant and a method of controlling the same.

Embodiments of the present disclosure provide a fuel cell thermal management system capable of preventing a frequent opening or closing of a valve by predicting an inlet temperature of a fuel cell stack in a process of meeting an amount of required heating required by a user and controlling a target inlet temperature range of the fuel cell stack and a revolutions per minute (RPM) of a coolant supply pump based on the predicted inlet temperature of the fuel cell stack.

Embodiments of the present disclosure provide a fuel cell thermal management system capable of increasing a temperature of coolant that is required during heating assistance and at the same time maintaining an appropriate temperature required by the fuel cell stack.

A fuel cell thermal management system according to an embodiment of the present disclosure is provided. A fuel cell thermal management system includes a radiator configured to perform heat exchange of a coolant discharged from a fuel cell stack, a coolant supply pump configured to supply the coolant to the fuel cell stack, a cathode oxygen depletion (COD) heater configured to increase a temperature of the coolant supplied from the coolant supply pump, a heater core disposed downstream of the COD heater and configured to perform heat exchange between the coolant heated by the COD heater and air for air conditioning in an interior of a vehicle, an air heater configured to heat the air passing through the heater core and supply the heated air to the interior of the vehicle, and a controller configured to predict an inlet temperature of the fuel cell stack and control a target temperature range of an inlet of the fuel cell stack based on the predicted inlet temperature of the fuel cell stack.

In one embodiment, the controller may is configured to calculate a power of the COD heater and a power of the air heater based on a determined amount of required heating and predict the inlet temperature of the fuel cell stack based on the power of the COD heater, a power of the fuel cell stack, the inlet temperature of the fuel cell stack, an outlet temperatures of the fuel cell stack, and a revolutions per minute (RPM) of the coolant supply pump.

In one embodiment, the controller may is configured to determine the power of each of the COD heater and the air heater based on a temperature of the coolant introduced into the COD heater.

In one embodiment, the controller may is configured to determine a higher ratio of the power of the COD heater to the air heater as the temperature of the coolant introduced into the COD heater increases.

In one embodiment, the controller may determine the amount of required heating based on an RPM of a blower disposed on a front end of the heater core, an external air temperature, a speed of a vehicle, a set temperature, and a type of an internal and external air circulation mode.

In one embodiment, the controller may compare the predicted inlet temperature of the fuel cell stack with the target temperature range and adjust the RPM of the coolant supply pump upward while adjusting the target temperature range upward in response to the predicted inlet temperature of the fuel cell stack being higher than or equal to an upper limit value of the target temperature range.

In one embodiment, the controller may is configured to control the powers of the COD heater, the air heater, and the fuel cell stack in a normal mode based on an amount of required heating.

In one embodiment, in response to the predicted inlet temperature of the fuel cell stack reaches a temperature limit or the RPM of the coolant supply pump reaching an RPM limit, the controller may is configured to control a valve for receiving the coolant from the fuel cell stack, the radiator, or the heater core so that the coolant discharged from the fuel cell stack flows to the radiator and for flowing the coolant to the coolant supply pump.

In one embodiment, in response to the predicted inlet temperature of the fuel cell stack being lower than a lower limit value of an initial target temperature range, the controller may is configured to correct the target temperature range to the initial target temperature range.

In one embodiment, in response to the predicted inlet temperature of the fuel cell stack being lower than a lower limit value of the target temperature range, the controller may is configured to maximally control a power of the COD heater and a power of the air heater without changing the target temperature range and to increase a power of the fuel cell stack.

A method of controlling a fuel cell thermal management system according to an embodiment of the present disclosure is provided. The method of controlling the fuel cell thermal management system includes determining, by a controller, an amount of required heating of a vehicle according to a user's request, determining, by the controller, a power of each of a COD heater configured to increase a temperature of a coolant and a power of an air heater configured to increase a temperature of air introduced into an interior of the vehicle based on the amount of required heating, predicting, by the controller, an inlet temperature of a fuel cell stack based on a power of the COD heater, the power of the fuel cell stack, the inlet temperature of the fuel cell stack, an outlet temperatures of the fuel cell stack, and a revolutions per minute (RPM) of a coolant supply pump, and controlling, by the controller, a target temperature range by comparing the predicted inlet temperature of the fuel cell stack with the target temperature range of an inlet of the fuel cell stack.

In one embodiment, the amount of required heating may be determined based on an RPM of a blower disposed on a front end of a heater core configured to perform heat exchange between the coolant heated by the COD heater and the air, an external air temperature, a speed of the vehicle, and a type of an internal and external air circulation mode.

In one embodiment, the controlling of the target temperature range may include adjusting the RPM of the coolant supply pump upward while adjusting the target temperature range upward in response to the predicted inlet temperature of the fuel cell stack being higher than or equal to an upper limit value of the target temperature range.

In one embodiment, in response to the predicted inlet temperature of the fuel cell stack reaching a temperature limit or the RPM of the coolant supply pump reaches an RPM limit, the controller may control a valve so that the coolant cooled by a radiator flows to the inlet of the fuel cell stack.

In one embodiment, the method may further include comparing the predicted inlet temperature of the fuel cell stack with an initial target temperature range after controlling the valve, wherein, when the predicted inlet temperature of the fuel cell stack is lower than a lower limit value of an initial target temperature range, the controller may correct the target temperature range to the initial target temperature range.

In one embodiment, the controlling of the target temperature range may include maximally controlling the powers of the COD heater and the air heater without changing the target temperature range and increasing the power of the fuel cell stack when the predicted inlet temperature of the fuel cell stack is lower than a lower limit value of the target temperature range.

According to an embodiment of the present disclosure, the controller may determine power distribution between the COD heater and the air heater based on the determined amount of required heating. That is, it is possible to prevent the situation in which the power of the air heater is excessively required in the process of increasing the temperature of the air supplied to the vehicle interior in order to meet the set temperature required by the user, thereby reducing the capacity of the air heater mounted on the vehicle.

According to an embodiment of the present disclosure, the controller can predict the inlet temperature of the fuel cell stack and control the target inlet temperature of the fuel cell stack and the RPM of the coolant supply pump to be increased based on the predicted inlet temperature of the fuel cell stack. Since the target inlet temperature of the fuel cell stack and the RPM of the coolant supply pump are controlled to be increased, it is possible to prevent the situation in which the valve is excessively opened or closed even when an overheating state of the coolant introduced into the fuel cell stack is predicted. Therefore, it is possible to increase the durability of the valve.

According to an embodiment of the present disclosure, the controller can increase the powers of the COD heater, the air heater, and the fuel cell stack in order to meet the interior set temperature of the vehicle set by the user when the overcooling state of the coolant introduced into the fuel cell stack is predicted, thereby quickly coping with the amount of required heating required by the user.

It is understood that the term "vehicle," "automotive," or "vehicular" or other similar term as used herein is inclusive of motor vehicles in general such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of embodiments of the present disclosure, and wherein.

Figure 1:
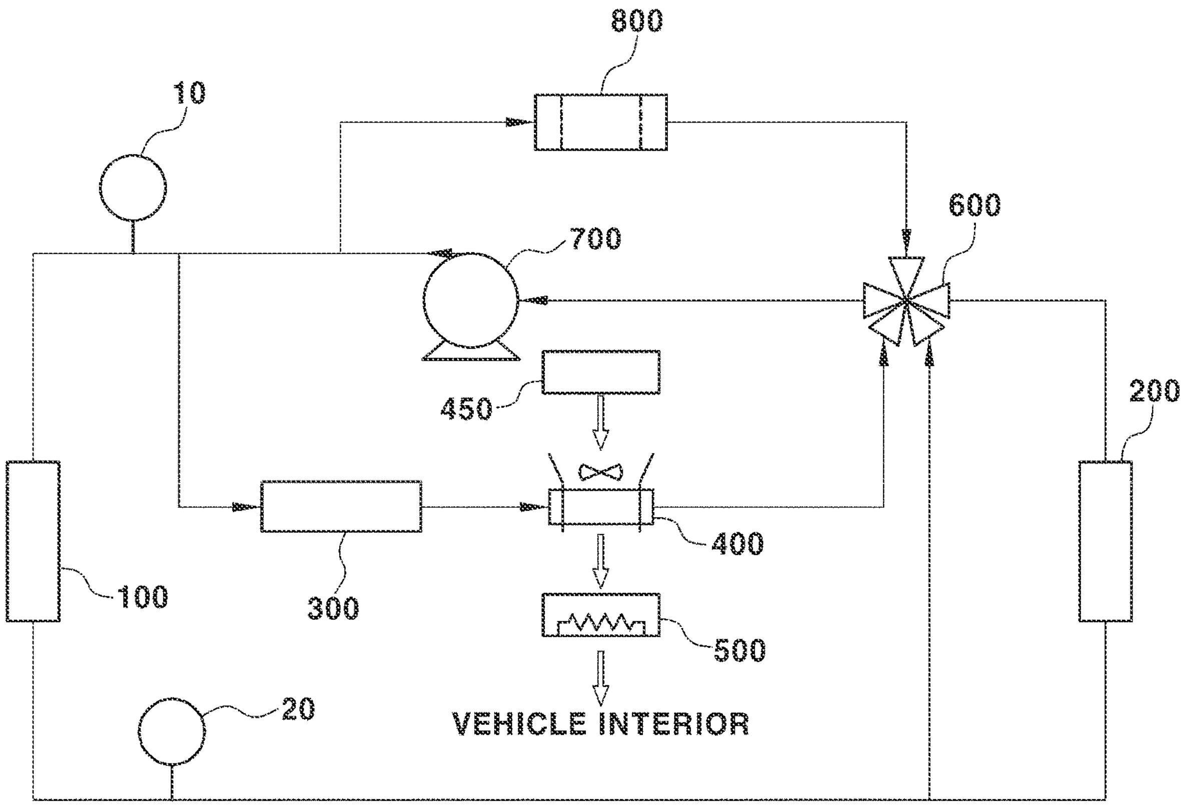
FIG. 1 is a view illustrating a fuel cell thermal management system according to an embodiment of the present disclosure.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent elements of embodiments of the present disclosure throughout the several figures of the drawings.

DETAILED DESCRIPTION OF ILLUSTRATIVE EMBODIMENTS

Advantages and features of embodiments of the present disclosure and methods for achieving them will become clear with reference to exemplary embodiments described below in detail in conjunction with the accompanying drawings. However, embodiments of the present disclosure are not limited to the embodiments disclosed below but can be implemented in various different forms, these embodiments are merely provided to make the disclosure of the present disclosure complete and fully inform those skilled in the art to which the present disclosure pertains of the scope of the present disclosure, and embodiments of the present disclosure are only defined by the scope of the appended claims. The same reference number indicates the same component throughout the specification.

In addition, terms such as " . . . part," " . . . unit," and " . . . member" described in the specification mean a unit for processing at least one function or operation, which may be implemented as software, hardware, or a combination of software and hardware.

In addition, in this specification, the names of the components are classified as first, second, etc., in order to classify them based on the relationship in which the names of the components are the same, and the order is not necessarily limited in the following description.

A detailed description is illustrative of embodiments of the present disclosure. In addition, the above-described contents are intended to illustrate and describe preferred embodiments of the present disclosure, and embodiments of the present disclosure can be used in various other combinations, modifications, and environments. That is, changes or modifications are possible without departing from the scope of the concept of the disclosure disclosed in the specification, the scope equivalent to the disclosed contents, and/or the scope of skill or knowledge in the art. The described embodiments describe the best mode for implementing the technical spirit of the present disclosure, and various changes required in specific application fields and uses of the present disclosure are also possible. Therefore, the detailed description of embodiments of the disclosure is not intended to limit the present disclosure to the disclosed embodiments. In addition, the appended claims should be construed to include other embodiments as well.

FIG. 1 is a view illustrating a fuel cell thermal management system according to an embodiment of the present disclosure.

Referring to FIG. 1, the fuel cell thermal management system may adjust a temperature of air supplied to a vehicle interior through heat exchange between coolant discharged from a fuel cell stack 100 and air for air conditioning in the vehicle interior. The air for air conditioning in the vehicle interior may refer to either air inside the vehicle or air outside the vehicle. The air used for heat exchange with the coolant may be determined by the type of an internal and external air circulation mode of the vehicle. For example, when a user selects the type of the internal and external air circulation mode so that the external air of the vehicle is not introduced into the vehicle, the air used for heat exchange with the coolant may be the air inside the vehicle. For example, when the user selects the type of the internal and external air circulation mode so that the external air of the vehicle is introduced into the vehicle, the air used for heat exchange with the coolant may be the air outside the vehicle. The fuel cell thermal management system may include the fuel cell stack 100, a radiator 200, a cathode oxygen depletion (COD) heater 300, a heater core 400, an air heater 500, a valve 600, and a coolant supply pump 700.

The fuel cell stack 100 may receive air and hydrogen and generate power through chemical reaction. Coolant may be introduced into the fuel cell stack 100 to emit heat, which is a by-product generated by the chemical reaction of the fuel cell stack 100. A first temperature sensor 10 may be disposed at an inlet side of the fuel cell stack 100, and a second temperature sensor 20 may be disposed at an outlet side of the fuel cell stack 100. The first temperature sensor 10 may measure a temperature of the coolant introduced into the fuel cell stack 100, and the second temperature sensor 20 may measure a temperature of the coolant discharged from the fuel cell stack 100.

The radiator 200 may re-cool the coolant heated after the chemical reaction of the fuel cell stack 100. Coolant cooled by the radiator 200 may flow to the valve 600.

The COD heater 300 may consume the power generated from the fuel cell stack 100 in order to heat the coolant when it is necessary to heat the coolant or reduce a voltage of the fuel cell stack 100. The COD heater 300 may be disposed on a line branched from the inlet side of the fuel cell stack 100. The line on which the COD heater 300 is disposed may connect the inlet of the fuel cell stack 100 and the valve 600.

The heater core 400 may perform heat exchange between the coolant heated by the COD heater 300 and the air for air conditioning in the vehicle interior. The heater core 400 may be disposed on the line branched from the inlet side of the fuel cell stack 100 and disposed downstream of the COD heater 300 based on a flow direction of the coolant. Coolant heat-exchanged in the heater core 400 may be introduced into the valve 600.

A blower 450 may be disposed on a front end of the heater core 400. The blower 450 is a component for promoting the introduction of the air and may supply the air inside the vehicle or the air outside the vehicle to the heater core 400.

The air heater 500 may directly heat the air supplied to the vehicle interior. The air heater 500 may heat the air supplied to the vehicle interior in order to adjust the interior temperature of the vehicle as desired by the user.

The valve 600 may control the opening and closing of the valve according to a control mode of the fuel cell thermal management system. The valve 600 may be a 5-way valve, but may not be specially limited thereto. The valve 600 may receive coolant from at least one of the fuel cell stack 100, the radiator 200, the heater core 400, and an ion filter 800, and the coolant may flow from the valve 600 toward the coolant supply pump 700. A flow rate and a flow direction of the coolant may be controlled according to the opening and closing of the valve 600.

The coolant supply pump 700 may supply the coolant transmitted from the valve 600 to the fuel cell stack 100, the COD heater 300, and/or the ion filter 800. As a revolutions per meter (RPM) of the coolant supply pump 700 is controlled, the flow rate of the coolant supplied to the fuel cell stack 100 may be controlled.

The ion filter 800 may remove ions included in the coolant. The ion filter 800 may remove the ions included in the coolant provided by the coolant supply pump 700, and the coolant from which the ions are removed may be introduced into the valve 600.

According to an embodiment of the present disclosure, the temperature of the air supplied to the vehicle interior may be determined by a temperature of the coolant, a power of the COD heater 300, and a power of the air heater 500. The power of the COD heater 300 and the power of the air heater 500 may be determined to control the temperature of the air inside the vehicle based on the amount of required heating required by the user. The temperature of the coolant supplied to the fuel cell stack 100 may be predicted based on the power of the COD heater 300 and the power of the air heater 500, and the target temperature range at the inlet side of the fuel cell stack 100 and the RPM of the coolant supply pump 700 may be controlled based on the predicted inlet temperature of the fuel cell stack 100.

According to an embodiment of the present disclosure, since the temperature of the air supplied to the vehicle interior may be increased by controlling the power of the COD heater 300, the waste heat of the coolant may be used in the air conditioning system for a vehicle.

Figure 2:
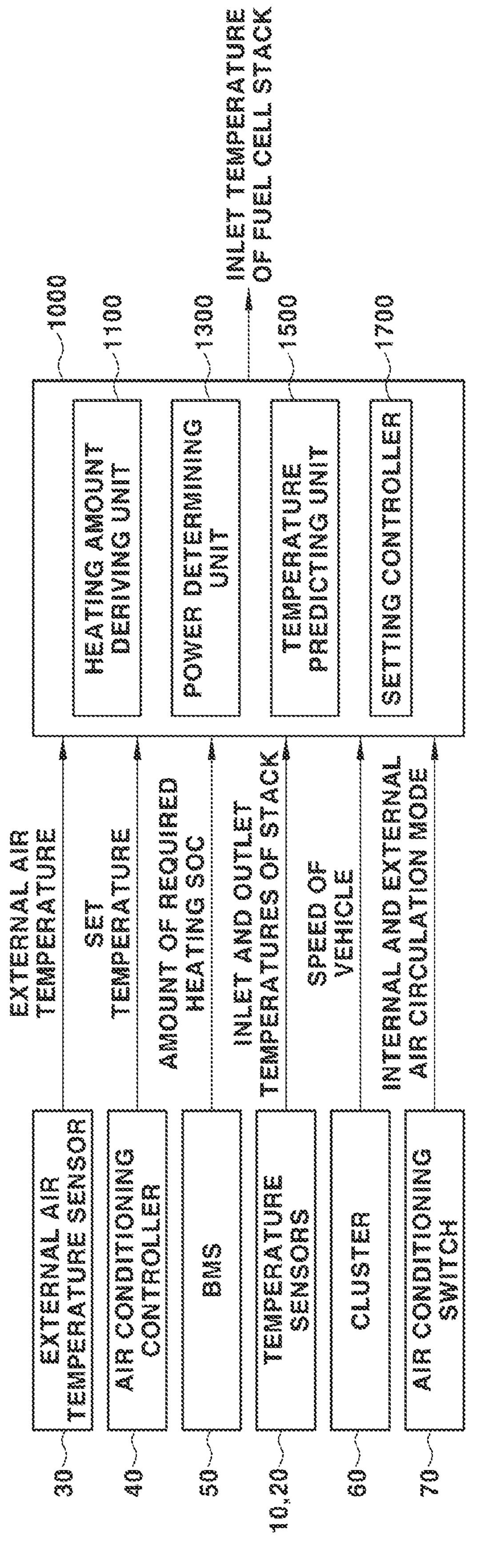
FIG. 2 is a view for describing a controller according to an embodiment of the present disclosure.

FIG. 2 is a view for describing a controller according to an embodiment of the present disclosure.

Referring to FIGS. 1 and 2, a controller 1000 may predict the inlet temperature of the fuel cell stack 100 and control the target temperature range of the inlet of the fuel cell stack 100 based on the predicted inlet temperature of the fuel cell stack 100. The controller 1000 may be a fuel cell control unit (FCU). The target temperature range of the inlet of the fuel cell stack 100 may be an ideal range of the inlet temperature of the fuel cell stack 100. For example, the target temperature of the inlet of the fuel cell stack 100 may be about 60° C., and the target temperature range of the inlet of the fuel cell stack 100 may be a predetermined range based on 60° C. An initial target temperature range of the fuel cell stack 100 determined upon designing the fuel cell system may be determined to be the predetermined range based on 60° C. The target temperature range of the inlet of the fuel cell stack 100 may have a lower limit value and an upper limit value.

The controller 1000 may receive various pieces of information through the temperature sensors 10 and 20, an external air temperature sensor 30, an air conditioning controller 40, a battery management system (BMS) 50, a cluster 60, and an air conditioning switch 70.

The temperature sensors 10 and 20 may measure the inlet temperature and the outlet temperature of the fuel cell stack 100. The first temperature sensor 10 may measure a temperature of the coolant introduced into the fuel cell stack 100, and the second temperature sensor 20 may measure a temperature of the coolant discharged from the fuel cell stack 100.

The external air temperature sensor 30 may measure a temperature outside the vehicle.

The air conditioning controller 40 may transmit information on a set temperature inside the vehicle determined by the user to the controller 1000. In addition, the air conditioning controller 40 may calculate the amount of required heating based on the set temperature inside the vehicle determined by the user. The amount of required heating may be an amount of heating required to meet the set temperature inside the vehicle determined by the user. However, the amount of required heating may also be calculated by the controller 1000.

The BMS 50 may transmit information on a state of charge (SOC) of a battery mounted on the vehicle to the controller 1000.

The cluster 60 may transmit information on a speed of the vehicle to the controller 1000.

The air conditioning switch 70 may transmit information on the type of the internal and external air circulation mode to the controller 1000. The type of the internal and external air circulation mode may be classified according to whether the air outside the vehicle is introduced into the vehicle interior, the air inside the vehicle is circulated, or the air outside the vehicle is mixed.

The controller 1000 may include a heating amount deriving unit 1100 for deriving the amount of required heating, a power determining unit 1300 for calculating the power of each of the COD heater 300 and the air heater 500, and a temperature predicting unit 1500 for predicting the inlet temperature of the fuel cell stack 100.

The heating amount deriving unit 1100 may determine the amount of required heating to predict the inlet temperature of the fuel cell stack 100. The heating amount deriving unit 1100 may determine the amount of required heating based on the RPM of the blower 450 disposed on the front end of the heater core 400, the external air temperature, the speed of the vehicle, the set temperature, and the type of the internal and external air circulation mode. The set temperature may be a required temperature inside the vehicle selected by the user.

The power determining unit 1300 may calculate the power of each of the COD heater 300 and the air heater 500 based on the determined amount of required heating. Specifically, the power determining unit 1300 may determine power distribution between the COD heater 300 and the air heater 500. The power distribution between the COD heater 300 and the air heater 500 may be determined based on the temperature of the coolant introduced into the COD heater 300. The power determining unit 1300 may determine the power of the COD heater 300 higher than that of the air heater 500 as the temperature of the coolant introduced into the COD heater 300 increases. That is, the power determining unit 1300 may determine a higher ratio of the power of the COD heater 300 to the air heater 500 as the temperature of the coolant introduced into the COD heater 300 increases.

When the coolant is in a state of being overheated, it may be more effective to increase the temperature of the air through heat exchange between the coolant and the air than to increase the temperature of the air supplied to the vehicle interior by increasing the power of the air heater 500. Conversely, when the coolant is in a low temperature state, it may be more effective to increase the temperature of the air supplied to the vehicle interior by increasing the power of the air heater 500 than to increase the temperature of the coolant by increasing the power of the COD heater 300. Therefore, the power determining unit 1300 may determine the power distribution between the COD heater 300 and the air heater 500 based on a predetermined appropriate temperature of the coolant. In this case, the predetermined appropriate temperature of the coolant may be a value that may be changed by a designer.

The temperature predicting unit 1500 may predict the inlet temperature of the fuel cell stack 100 based on the power of the COD heater 300, the power of the fuel cell stack 100, the inlet and outlet temperatures of the fuel cell stack 100, and the RPM of the coolant supply pump 700. The temperature predicting unit 1500 may distribute a separate weight to each of the power of the COD heater 300, the power of the fuel cell stack 100, the inlet and outlet temperatures of the fuel cell stack 100, and the RPM of the coolant supply pump 700 and may predict the inlet temperature of the fuel cell stack 100 based on values to which the weights are applied. In this case, a method of distributing the weights and predicting the inlet temperature of the fuel cell stack 100 may be variously applied.

A setting controller 1700 may control the target temperature range of the fuel cell stack 100 and the RPM of the coolant supply pump 700 based on the predicted inlet temperature of the fuel cell stack 100. The setting controller 1700 may compare the predicted inlet temperature of the fuel cell stack 100 with the target temperature range of the fuel cell stack 100. Based on a result of comparing the predicted inlet temperature of the fuel cell stack 100 and the target temperature range of the fuel cell stack 100, the setting controller 1700 may control the target temperature range of the fuel cell stack 100, the RPM of the coolant supply pump 700, the power of the fuel cell stack 100, and the powers of the COD heater 300 and the air heater 500.

For example, when the predicted inlet temperature of the fuel cell stack 100 is within the target temperature range of the fuel cell stack 100, the setting controller 1700 may not change the RPM of the coolant supply pump 700 and the target temperature range of the fuel cell stack 100. When the predicted inlet temperature of the fuel cell stack 100 is within the target temperature range of the fuel cell stack 100, it may mean that the inlet temperature of the fuel cell stack 100 is ideally maintained. Therefore, the setting controller 1700 may control the power of the fuel cell stack 100 and the RPM of the coolant supply pump 700 in a normal mode without changing the target temperature range of the fuel cell stack 100. When the power of the fuel cell stack 100 and the RPM of the coolant supply pump 700 in the normal mode are controlled, it may mean that the power of the fuel cell stack 100 and the RPM of the coolant supply pump 700 are controlled according to a control strategy of the fuel cell thermal management system. In addition, the setting controller 1700 may control the powers of the COD heater 300 and the air heater 500 in the normal mode. When the powers of the COD heater 300 and the air heater 500 are controlled in the normal mode, it may mean that the powers are controlled according to the amount of required heating required by the user or a heating load.

For example, when the predicted inlet temperature of the fuel cell stack 100 exceeds the target temperature range of the fuel cell stack 100, the setting controller 1700 may adjust the RPM of the coolant supply pump 700 upward while adjusting the target temperature range of the fuel cell stack 100 upward. When the predicted inlet temperature of the fuel cell stack 100 exceeds the target temperature range of the fuel cell stack 100, it may mean that the predicted inlet temperature of the fuel cell stack 100 exceeds the upper limit value of the target temperature range of the fuel cell stack 100. Degrees at which the upward adjustments of the target temperature range of the fuel cell stack 100 and the RPM of the coolant supply pump 700 are made may be predetermined by the designer. For example, the degree at which the upward adjustment of the RPM of the coolant supply pump 700 is made may be previously calculated to the extent that the flow rate of the coolant capable of allowing a difference between the inlet temperature and the outlet temperature of the fuel cell stack 100 to normally maintain can be implemented. For example, the extent to which the upward adjustment of the target temperature range of the fuel cell stack 100 is made may be predetermined by the designer.

When the predicted inlet temperature of the fuel cell stack 100 exceeds the target temperature range of the fuel cell stack 100, it may mean that the coolant introduced into the fuel cell stack 100 is predicted to be overheated. A situation in which the coolant is overheated may occur due to various factors and may include a situation in which a failure of the COD heater 300 causes the COD heater 300 to continuously generate heat, a situation in which the power of the fuel cell stack 100 rapidly increases, a situation in which the COD heater 300 consumes the remaining power generated from the fuel cell stack 100, etc. In these situations, the valve 600 may be generally controlled to control the coolant to flow to the radiator 200, and the excessive operation of the valve 600 may cause a failure of the valve 600. Therefore, in order to prevent the excessive operation of the valve 600, the setting controller 1700 may adjust the RPM of the coolant supply pump 700 upward while adjusting the target temperature range of the fuel cell stack 100 upward. As the RPM of the coolant supply pump 700 is adjusted upward, the difference between the inlet temperature and the outlet temperature of the fuel cell stack 100 may be reduced. In addition, by adjusting the target temperature range of the fuel cell stack 100 upward, the predicted inlet temperature of the fuel cell stack 100 may be matched with the target temperature range of the fuel cell stack 100. The setting controller 1700 may normally control the powers of the COD heater 300, the air heater 500, and the fuel cell stack 100 in the normal mode based on the amount of required heating.

For example, when the predicted inlet temperature of the fuel cell stack 100 is lower than the target temperature range of the fuel cell stack 100, the setting controller 1700 may maximally control the powers of the COD heater 300 and the air heater 500 and increase the power of the fuel cell stack 100 without changing the target temperature range of the fuel cell stack 100. In this case, the coolant supply pump 700 may be controlled in the normal mode.

When the predicted inlet temperature of the fuel cell stack 100 is lower than the target temperature range of the fuel cell stack 100, it may mean that the predicted inlet temperature of the fuel cell stack 100 is lower than the lower limit value of the target temperature range of the fuel cell stack 100. When the predicted inlet temperature of the fuel cell stack 100 is lower than the target temperature range of the fuel cell stack 100, it may mean that the coolant introduced into the fuel cell stack 100 is predicted to be in an overcooling state. Therefore, the setting controller 1700 may control powers of the COD heater 300 and the air heater 500 to the maximum in order to meet the heating amount required by the user. In addition, the setting controller 1700 may increase the power of the fuel cell stack 100 to quickly heat the coolant. The degree at which the power of the fuel cell stack 100 is increased may be preset by the designer, and the increase in the power of the fuel cell stack 100 may be affected by the predicted inlet temperature of the fuel cell stack 100. The remaining power generated as the power of the fuel cell stack 100 increases may be used for charging the battery or used for the COD heater 300 in consideration of the SOC of the battery mounted on the vehicle. The setting controller 1700 may control the RPM of the coolant supply pump 700 in the normal mode without changing the target temperature range of the fuel cell stack 100.

According to an embodiment of the present disclosure, the controller 1000 may determine the power distribution between the COD heater 300 and the air heater 500 based on the determined amount of required heating. That is, it is possible to prevent the situation in which the power of the air heater 500 is excessively required in the process of increasing the temperature of the air supplied to the vehicle interior in order to meet the set temperature required by the user, thereby reducing the capacity of the air heater 500 mounted on the vehicle.

According to an embodiment of the present disclosure, the controller 1000 may predict the inlet temperature of the fuel cell stack 100 and control the inlet temperature of the fuel cell stack 100 and the RPM of the coolant supply pump 700 to be increased based on the predicted inlet temperature of the fuel cell stack 100. Since the target inlet temperature of the fuel cell stack 100 and the RPM of the coolant supply pump 700 are controlled to be increased, it is possible to prevent the situation in which the valve 600 is excessively opened or closed and uniformly maintain an average temperature inside the fuel cell stack 100 even when the coolant introduced into the fuel cell stack 100 is expected to be in the overheating state.

According to an embodiment of the present disclosure, when the coolant introduced into the fuel cell stack 100 is expected to be in an overcooling state, the controller 1000 may increase the powers of the COD heater 300, the air heater 500, and the fuel cell stack 100 in order to meet the interior set temperature of the vehicle set by the user. Therefore, it is possible to quickly respond to the amount of required heating required by the user.

Figure 3:
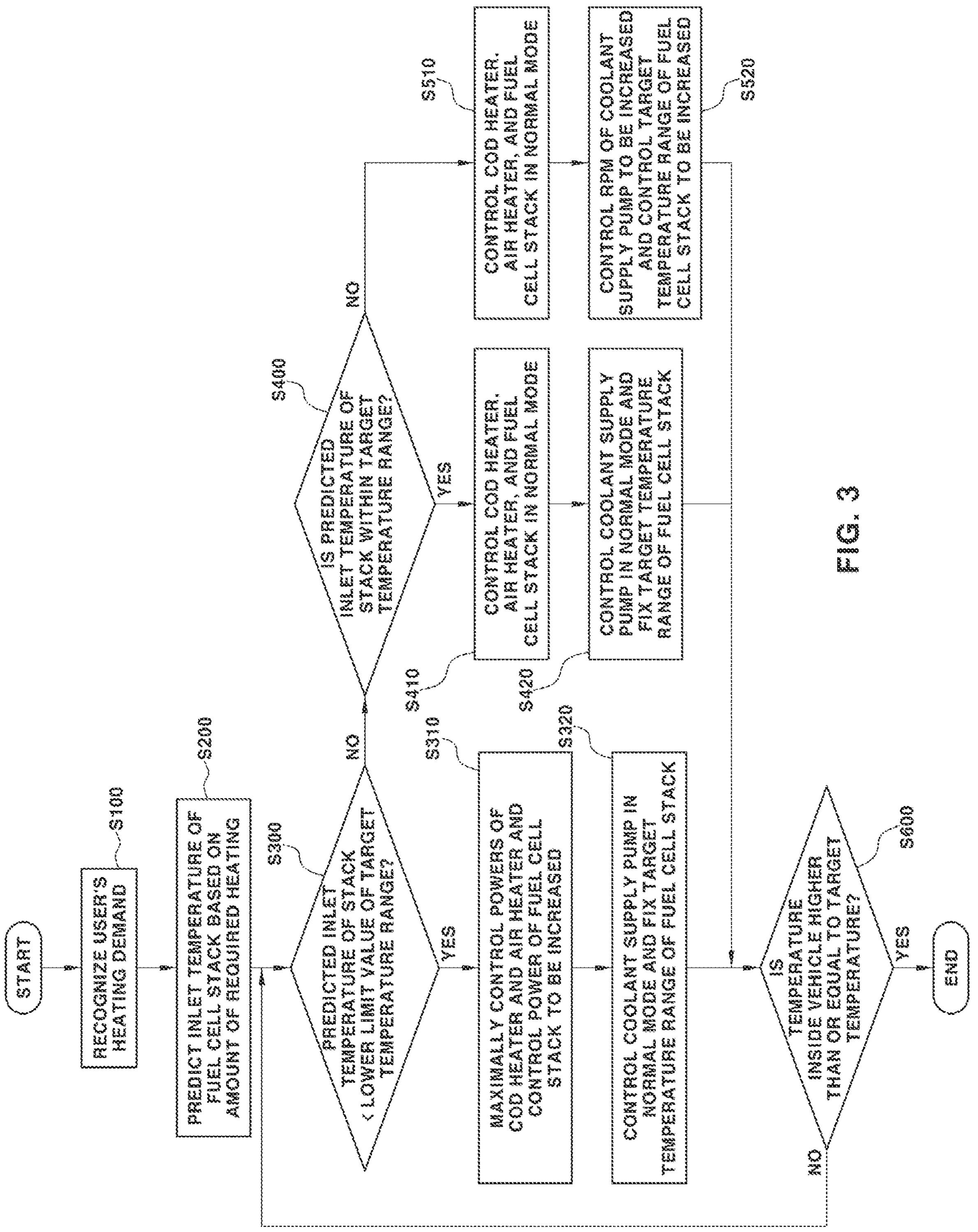
FIG. 3 is a flowchart illustrating a method of controlling the fuel cell thermal management system according to an inlet temperature of a fuel cell stack according to an embodiment of the present disclosure.

FIG. 3 is a flowchart illustrating a method of controlling the fuel cell thermal management system according to an inlet temperature of a fuel cell stack according to an embodiment of the present disclosure.

Referring to FIGS. 1 to 3, the controller 1000 may recognize a user's heating demand based on a signal received from the air conditioning controller 40 and/or a signal received from the air conditioning switch 70 (S100).

The controller 1000 may derive the amount of required heating based on the set temperature of the vehicle set by the user. The amount of required heating may be determined based on the RPM of the blower 450 disposed on the front end of the heater core 400, the external air temperature, the speed of the vehicle, the set temperature, and the type of the internal and external air circulation mode. The controller 1000 may predict the inlet temperature of the fuel cell stack 100 based on the amount of required heating. The controller 1000 may calculate the powers of the COD heater 300 and the air heater 500 based on the amount of required heating and predict the inlet temperature of the fuel cell stack 100 based on the power of the COD heater 300, the power of the fuel cell stack 100, the inlet and outlet temperatures of the fuel cell stack 100, and the RPM of the coolant supply pump 700 (S200).

The controller 1000 may compare the predicted inlet temperature of the fuel cell stack 100 with the lower limit value of the target temperature range of the fuel cell stack 100 (S300).

When the predicted inlet temperature of the fuel cell stack 100 is lower than the lower limit value of the target temperature range of the fuel cell stack 100, the controller 1000 may maximally control the powers of the COD heater 300 and the air heater 500 and control the power of the fuel cell stack 100 to be increased. As the power of the fuel cell stack 100 is increased, the temperature of the coolant may be increased. The powers of the COD heater 300 and the air heater 500 may be maximally controlled to correspond to the amount of required heating corresponding to the set temperature set by the user (S310).

The controller 1000 may control the RPM of the coolant supply pump 700 in the normal mode without the upward adjustment of the RPM of the coolant supply pump 700. In addition, the controller 1000 may fix the target temperature range of the fuel cell stack 100 without changing the target temperature range of the fuel cell stack 100 (S320).

When the predicted inlet temperature of the fuel cell stack 100 is not lower than the lower limit value of the target temperature range of the fuel cell stack 100, the controller 1000 may determine whether the predicted inlet temperature of the fuel cell stack 100 is within the target temperature range of the fuel cell stack 100 (S400).

When the predicted inlet temperature of the fuel cell stack 100 is within the target temperature range of the fuel cell stack 100, the controller 1000 may control the COD heater 300, the air heater 500, and the fuel cell stack 100 in the normal mode. When the predicted inlet temperature of the fuel cell stack 100 is within the target temperature range of the fuel cell stack 100, since the predicted inlet temperature of the fuel cell stack 100 is maintained at an appropriate level, the controller 1000 may control the COD heater 300, the air heater 500, and the fuel cell stack 100 based on the amount of required heating, and additional control may not be performed (S410).

The controller 1000 may control the RPM of the coolant supply pump 700 in the normal mode and fix the target temperature range of the fuel cell stack 100 without changing the target temperature range of the fuel cell stack 100 (S420).

When the predicted inlet temperature of the fuel cell stack 100 is not within the target temperature range of the fuel cell stack 100, the controller 1000 may control the COD heater 300, the air heater 500, and the fuel cell stack 100 in the normal mode (S510).

However, the controller 1000 may control the RPM of the coolant supply pump 700 to be increased and control the target temperature range of the fuel cell stack 100 to be increased (S520). As the RPM of the coolant supply pump 700 is controlled to be increased, the difference between the inlet temperature and outlet temperature of the fuel cell stack 100 is maintained at an appropriate level, and thus the internal temperature of the fuel cell stack 100 may be normally maintained. In addition, by controlling the target temperature range of the fuel cell stack 100 to be increased, it is possible to prevent a situation in which the valve 600 is controlled to cool the coolant.

After performing control to maintain the internal temperature of the fuel cell stack 100, the controller 1000 may determine whether the temperature inside the vehicle is higher than or equal to the set temperature, which is a target temperature (S600). That is, the controller 1000 may determine whether the temperature inside the vehicle has reached the set temperature set by the user. When the temperature inside the vehicle reaches the set temperature set by the user, the controller 1000 may terminate the control strategy that controls the COD heater 300, the air heater 500, the fuel cell stack 100, and the coolant supply pump 700 according to the amount of required heating. When the temperature inside the vehicle does not reach the set temperature set by the user, the controller 1000 may re-predict the inlet temperature of the fuel cell stack 100 to meet the amount of required heating and repeatedly perform the control strategy that controls at least one of the COD heater 300, the air heater 500, the fuel cell stack 100, and the coolant supply pump 700 according to the predicted inlet temperature of the fuel cell stack 100.

Figure 4:
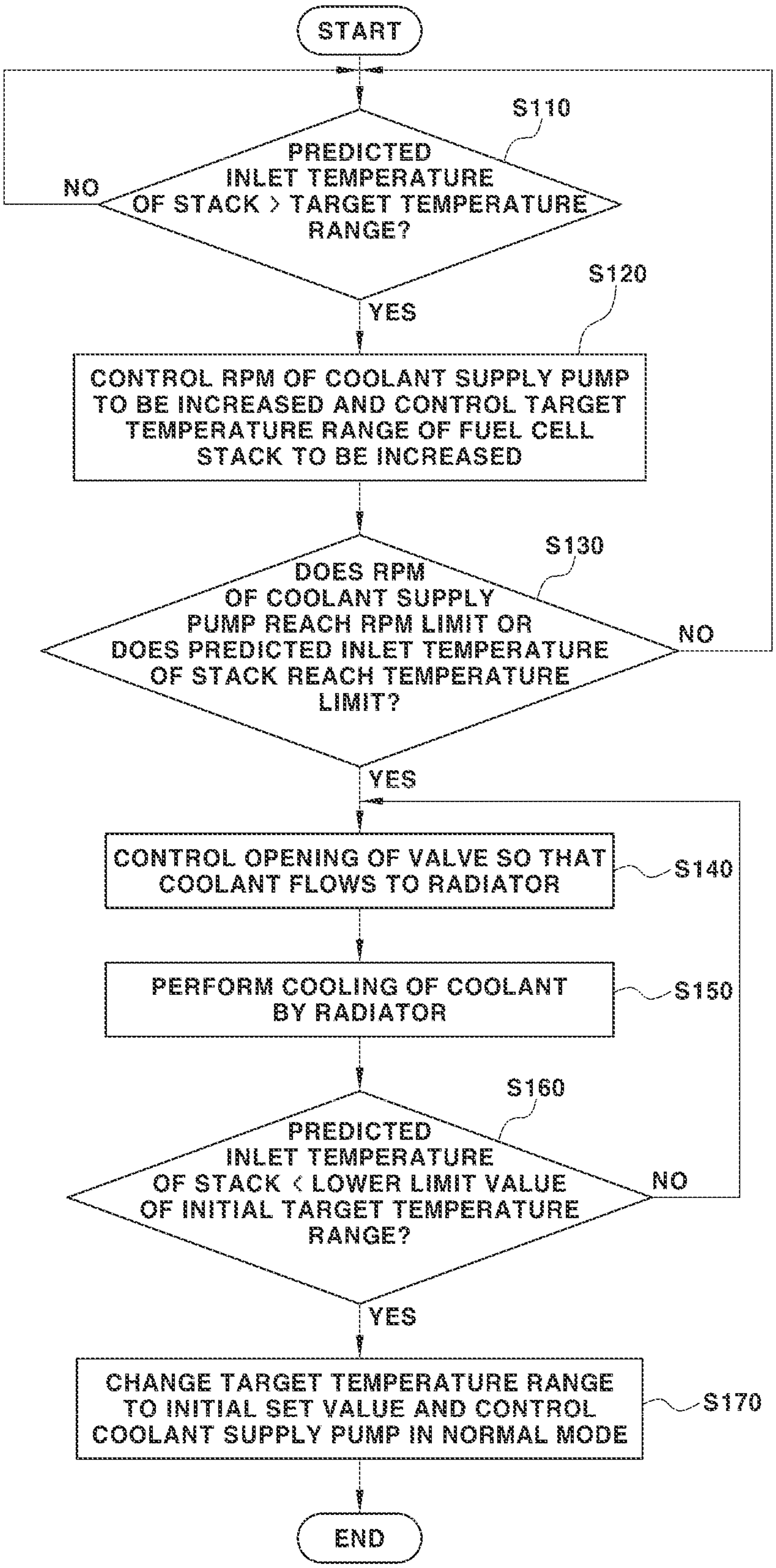
FIG. 4 is a flowchart illustrating a method of controlling a fuel cell thermal management system when a predicted inlet temperature of a fuel cell stack is higher than a target temperature range according to an embodiment of the present disclosure.

FIG. 4 is a flowchart illustrating a method of controlling a fuel cell thermal management system when a predicted inlet temperature of a fuel cell stack is higher than a target temperature range according to an embodiment of the present disclosure. For simplification of description, a description of overlapping contents will be omitted.

Referring to FIGS. 1, 2, and 4, the controller 1000 may compare the predicted inlet temperature of the fuel cell stack 100 with the target temperature range of the fuel cell stack 100. Specifically, the controller 1000 may determine whether the predicted inlet temperature of the fuel cell stack 100 exceeds the upper limit value of the target temperature range of the fuel cell stack 100 (S110).

When the predicted inlet temperature of the fuel cell stack 100 exceeds the upper limit value of the target temperature range of the fuel cell stack 100, the controller 1000 may control the RPM of the coolant supply pump 700 to be increased and control the target temperature range of the fuel cell stack 100 to be increased (S120). At this time, the controller 1000 may not control the powers of the COD heater 300, the air heater 500, and the fuel cell stack 100. That is, the controller 1000 may control the powers of the COD heater 300, the air heater 500, and the fuel cell stack 100 in the normal mode.

The controller 1000 may continuously predict the inlet temperature of the fuel cell stack 100 after controlling the RPM of the coolant supply pump 700 and the target temperature range of the fuel cell stack 100 to be increased and compare the predicted inlet temperature of the fuel cell stack 100 with the upward-adjusted target temperature range of the fuel cell stack 100. When the predicted inlet temperature of the fuel cell stack 100 exceeds the upward-adjusted target temperature range of the fuel cell stack 100, the controller 1000 may continuously control the RPM of the coolant supply pump 700 to be increased and the target temperature range of the fuel cell stack 100 to be increased. However, when the RPM of the coolant supply pump 700 reaches an RPM limit or the predicted inlet temperature of the fuel cell stack 100 reaches a temperature limit, the controller 1000 may not control the RPM of the coolant supply pump 700 and the target temperature range of the fuel cell stack 100 to be increased. Therefore, the controller 1000 may determine whether the RPM of the coolant supply pump 700 reaches the RPM limit or the predicted inlet temperature of the fuel cell stack 100 reaches the temperature limit (S130).

When the RPM of the coolant supply pump 700 reaches the RPM limit or the predicted inlet temperature of the fuel cell stack 100 reaches the temperature limit, since the controller 1000 may no longer control the RPM of the coolant supply pump 700 and the target temperature of the fuel cell stack 100 to be increased, the controller 1000 may control the valve 600 to cool the excessively heated coolant and maintain the internal temperature of the fuel cell stack 100 (S140).

The controller 1000 may control the opening of the valve 600 so that the coolant discharged from the fuel cell stack 100 flows to the radiator 200 and the coolant may be cooled by the radiator 200. The coolant cooled by the radiator 200 may be introduced into the fuel cell stack 100 through the valve 600. As the cooled coolant is introduced into the fuel cell stack 100, the inlet temperature of the fuel cell stack 100 predicted by the controller 1000 may be reduced (S150).

The controller 1000 may continuously predict the inlet temperature of the fuel cell stack 100 and determine whether the predicted inlet temperature of the fuel cell stack 100 is lower than the lower limit value of the initial target temperature range (S160). The initial target temperature range may be predetermined upon designing the fuel cell system. When the predicted inlet temperature of the fuel cell stack 100 is higher than or equal to the lower limit of the initial target temperature range, the controller 1000 may maintain the opening of the valve 600 so that the coolant is introduced into the radiator 200 and the coolant cooled by the radiator 200 is introduced into the fuel cell stack 100.

When the predicted inlet temperature of the fuel cell stack 100 is lower than the lower limit value of the initial target temperature range of the fuel cell stack 100, the controller 1000 may correct the target temperature range of the fuel cell stack 100 to the initial target temperature range that is an initial set value. The controller 1000 may control the RPM of the coolant supply pump 700 in the normal mode. In addition, the controller 1000 may control the opening degree of the valve 600 so that the coolant cooled by the radiator 200 does not flow to the inlet of the fuel cell stack 100 (S170).

Although the embodiments of the present disclosure have been described above with reference to the accompanying drawings, those skilled in the art to which the present disclosure pertains will be able to understand that embodiments of the present disclosure can be carried out in other specific forms without changing the technical spirit or essential features thereof. Therefore, it should be understood that the above-described embodiments are illustrative and not restrictive in all respects.

What is claimed is:

1. A fuel cell thermal management system comprising:
- a radiator configured to perform heat exchange of a coolant discharged from a fuel cell stack;
- a coolant supply pump configured to supply the coolant to the fuel cell stack;
- a cathode oxygen depletion (COD) heater configured to increase a temperature of the coolant supplied from the coolant supply pump;
- a heater core disposed downstream of the COD heater and configured to perform heat exchange between the coolant heated by the COD heater and air for air conditioning in an interior of a vehicle;
- an air heater configured to heat the air passing through the heater core and supply the heated air to the interior of the vehicle; and
- a controller configured to:
  - calculate a power of the COD heater and a power of the air heater based on a determined amount of required heating;
  - predict an inlet temperature of the fuel cell stack based on the power of the COD heater, a power of the fuel cell stack, an outlet temperature of the fuel cell stack, and a revolutions per minute (RPM) of the coolant supply pump; and
  - control a target temperature range of an inlet of the fuel cell stack based on the predicted inlet temperature of the fuel cell stack.

2. The system of claim 1, wherein the controller is configured to determine the power of each of the COD heater and the air heater based on a temperature of the coolant introduced into the COD heater.

3. The system of claim 2, wherein the controller is configured to determine a higher ratio of the power of the COD heater to the air heater as the temperature of the coolant introduced into the COD heater increases.

4. The system of claim 1, wherein the controller is configured to determine the amount of required heating based on an RPM of a blower disposed on a front end of the heater core, an external air temperature, a speed of the vehicle, a set temperature, and a type of an internal and external air circulation mode.

5. The system of claim 1, wherein the controller is configured to:
- compare the predicted inlet temperature of the fuel cell stack with the target temperature range; and adjust the RPM of the coolant supply pump upward while adjusting the target temperature range upward in response to the predicted inlet temperature of the fuel cell stack being higher than or equal to an upper limit value of the target temperature range.

6. The system of claim 5, wherein the controller is configured to control the powers of the COD heater, the air heater, and the fuel cell stack in a normal mode based on an amount of required heating.

7. The system of claim 5, wherein, in response to the predicted inlet temperature of the fuel cell stack reaching a temperature limit or the RPM of the coolant supply pump reaching an RPM limit, the controller is configured to control a valve for receiving the coolant from the fuel cell stack, the radiator, or the heater core so that the coolant discharged from the fuel cell stack flows to the radiator and for flowing so that the coolant flows to the coolant supply pump.

8. The system of claim 7, wherein, in response to the predicted inlet temperature of the fuel cell stack being lower than a lower limit value of an initial target temperature range, the controller is configured to correct the target temperature range to the initial target temperature range.

9. The system of claim 1, wherein, in response to the predicted inlet temperature of the fuel cell stack being lower than a lower limit value of the target temperature range, the controller is configured to maximally control a power of the COD heater and a power of the air heater without changing the target temperature range and to increase a power of the fuel cell stack.

10. A fuel cell thermal management system comprising:

a radiator configured to perform heat exchange of a coolant discharged from a fuel cell stack;

a coolant supply pump configured to supply the coolant to the fuel cell stack;

a cathode oxygen depletion (COD) heater configured to increase a temperature of the coolant supplied from the coolant supply pump;

a heater core disposed downstream of the COD heater and configured to perform heat exchange between the coolant heated by the COD heater and air for air conditioning in an interior of a vehicle;

an air heater configured to heat the air passing through the heater core and supply the heated air to the interior of the vehicle; and a controller configured to:

predict an inlet temperature of the fuel cell stack;

control a target temperature range of an inlet of the fuel cell stack based on the predicted inlet temperature of the fuel cell stack;

in response to the predicted inlet temperature of the fuel cell stack being lower than a lower limit value of the target temperature range, maximally control a power of the COD heater and a power of the air heater without changing the target temperature range to increase a power of the fuel cell stack.

11. The system of claim 10, wherein the controller is configured to determine the power of each of the COD heater and the air heater based on a temperature of the coolant introduced into the COD heater.

12. The system of claim 11, wherein the controller is configured to determine a higher ratio of the power of the COD heater to the air heater as the temperature of the coolant introduced into the COD heater increases.

13. The system of claim 10, wherein the controller is configured to:

compare the predicted inlet temperature of the fuel cell stack with the target temperature range; and adjust the RPM of the coolant supply pump upward while adjusting the target temperature range upward in response to the predicted inlet temperature of the fuel cell stack being higher than or equal to an upper limit value of the target temperature range.

14. The system of claim 13, wherein the controller is configured to control the powers of the COD heater, the air heater, and the fuel cell stack in a normal mode based on an amount of required heating.

15. The system of claim 13, wherein, in response to the predicted inlet temperature of the fuel cell stack reaching a temperature limit or the RPM of the coolant supply pump reaching an RPM limit, the controller is configured to control a valve for receiving the coolant from the fuel cell stack, the radiator, or the heater core so that the coolant discharged from the fuel cell stack flows to the radiator and so that the coolant flows to the coolant supply pump.

16. The system of claim 15, wherein, in response to the predicted inlet temperature of the fuel cell stack being lower than a lower limit value of an initial target temperature range, the controller is configured to correct the target temperature range to the initial target temperature range.

* * * * *